United States Patent
Benhanokh et al.

(10) Patent No.: US 10,318,180 B1
(45) Date of Patent: Jun. 11, 2019

(54) METADATA PAGING MECHANISM TUNED FOR VARIABLE WRITE-ENDURANCE FLASH

(71) Applicant: EMC IP HOLDING COMPANY LLC, Hopkinton, MA (US)

(72) Inventors: Gabriel Benhanokh, Tel-Aviv (IL); Assaf Natanzon, Tel-Aviv (IL); Alexandr Veprinsky, Brookline, MA (US); Arieh Don, Newton, MA (US); Felix Shvaiger, Brighton, MA (US)

(73) Assignee: EMC IP Holding Cmpany LLC, Hopkinton, MA (US)

( * ) Notice: Subject to any disclaimer, the term of this patent is extended or adjusted under 35 U.S.C. 154(b) by 247 days.

(21) Appl. No.: 15/384,445

(22) Filed: Dec. 20, 2016

(51) Int. Cl.
*G06F 12/00* (2006.01)
*G06F 3/06* (2006.01)
*G06F 12/0802* (2016.01)

(52) U.S. Cl.
CPC ............ *G06F 3/0616* (2013.01); *G06F 3/065* (2013.01); *G06F 3/0659* (2013.01); *G06F 3/0685* (2013.01); *G06F 12/0802* (2013.01); *G06F 2212/1036* (2013.01); *G06F 2212/60* (2013.01)

(58) Field of Classification Search
CPC ...... G06F 3/0616; G06F 3/065; G06F 3/0685; G06F 3/0659; G06F 12/0802; G06F 2212/60; G06F 2212/1036
See application file for complete search history.

(56) References Cited

U.S. PATENT DOCUMENTS

| | | | | |
|---|---|---|---|---|
| 8,977,803 B2 * | 3/2015 | Horn | ................. | G06F 12/0871 711/103 |
| 2011/0191522 A1 * | 8/2011 | Condict | ................ | G06F 12/123 711/103 |
| 2014/0229656 A1 * | 8/2014 | Goss | .................. | G06F 12/0246 711/103 |
| 2014/0379960 A1 * | 12/2014 | Linkewitsch | ....... | G06F 12/0246 711/103 |
| 2017/0168942 A1 * | 6/2017 | Bernat | ................ | G06F 12/0833 |

* cited by examiner

*Primary Examiner* — David Yi
*Assistant Examiner* — Alan Otto
(74) *Attorney, Agent, or Firm* — Anderson Gorecki LLP

(57) ABSTRACT

A storage array uses both high endurance SSDs and low endurance SSDs for metadata paging. Wear cost values are calculated for each page of metadata in cache. The wear cost values are used to select pages for swapping out of the cache to the SSDs. The wear cost values may be calculated as a function of a first term that is indicative of whether the respective page of metadata will be written to high endurance or low endurance SSDs; a second term that is indicative of likelihood of data associated with the respective pages of metadata that will possibly be changed due to a write; and a third term that is indicative of age of the respective page of metadata in the cache since most recent use. The terms may be estimated and independently weighted. The portion of cache allocated for the metadata may be increased to avoid exceeding DWPD targets.

18 Claims, 4 Drawing Sheets

METADATA PAGING MECHANISM TUNED FOR VARIABLE WRITE-ENDURANCE FLASH

BACKGROUND

The subject matter of this disclosure is generally related to computer networks in which a data storage system is used to maintain data for multiple host servers and concurrent users. The host servers may run host applications such as a database, file server or block server, for example and without limitation. The data storage system may include one or more storage arrays, each of which may include a plurality of interconnected computing nodes. The computing nodes manage access to host application data stored on tangible data storage devices such as disk drives and flash drives. For example, the computing nodes may present one or more logical production volumes to the host applications. The logical production volumes are backed by the tangible data storage devices. The host applications access host application data by sending IOs with reference to the production volumes. The data sets and metadata associated with host applications may be large.

SUMMARY

All examples, aspects and features mentioned in this document can be combined in any technically possible way.

In accordance with an aspect an apparatus comprises: a plurality of computing nodes, each computing node comprising a processor and a cache; a plurality of non-volatile data storage drives on which data is stored, the data being accessed by the computing nodes to service IOs (input-output requests); persistent metadata storage comprising: a first non-volatile metadata storage device on which metadata is stored, the metadata indicating locations of extents of the data on the data storage drives, the first metadata storage device having a first write endurance; and a second non-volatile metadata storage device on which metadata is stored, the second metadata storage device having a second write endurance, wherein the first write endurance is greater than the second write endurance; and a program, stored on non-transitory computer-readable memory, that selects, based on wear cost values of each of multiple pages of metadata in the cache, a first page of metadata to evict from the cache to the persistent metadata storage in order to free space for a second page of metadata. In some implementations the wear cost values are calculated as a function of a cache write resiliency ratio that is indicative of whether the respective page of metadata will be written to the first non-volatile metadata storage device or the second non-volatile metadata storage device. In some implementations the cache write resiliency ratio is an estimate based on capacity of the first non-volatile metadata storage device relative to capacity of the second non-volatile metadata storage device. In some implementations the wear cost values are calculated as a function of a RD/WR (Read/Write) ratio that is indicative of likelihood of data associated with the respective pages of metadata that will possibly be changed due to a write. In some implementations the RD/WR ratio is an estimate based on an IO profile of multiple extents of the data. In some implementations the wear cost values are calculated as a function of a term that is indicative of age of the respective page of metadata in the cache since most recent use. In some implementations the wear cost values are calculated as a function of: a first term that is indicative of whether the respective page of metadata will be written to the first non-volatile metadata storage device or the second non-volatile metadata storage device; a second term that is indicative of likelihood of data associated with the respective pages of metadata that will possibly be changed due to a write; and a third term that is indicative of age of the respective page of metadata in the cache since most recent use. In some implementations the first term, the second term and the third term are each independently weighted. In some implementations the first term and the second term are estimates based on an IO profile, and wherein the weights are adjusted in response to a change in the IO profile. In some implementations a portion of the cache is allocated for the metadata, and the portion of cache allocated for the metadata is adjusted in size based on a difference between calculated write count limit per unit time period for the second non-volatile metadata storage drive and actual writes per unit time period for the second non-volatile metadata storage drive.

In accordance with an aspect a method comprises: in a storage array comprising a plurality of computing nodes, each computing node comprising a processor and a cache, and a plurality of non-volatile data storage drives on which data is stored, the data being accessed by the computing nodes to service IOs (input-output requests): maintaining metadata on persistent metadata storage comprising: a first non-volatile metadata storage device on which metadata is stored, the metadata indicating locations of extents of the data on the data storage drives, the first metadata storage device having a first write endurance; and a second non-volatile metadata storage device on which metadata is stored, the second metadata storage device having a second write endurance, wherein the first write endurance is greater than the second write endurance; selecting, based on wear cost values of each of multiple pages of metadata in the cache, a first page of metadata to evict from the cache to the persistent metadata storage in order to free space for a second page of metadata; and evicting the first page of metadata from the cache. Some implementations comprise calculating the wear cost values as a function of a cache write resiliency ratio that is indicative of whether the respective page of metadata will be written to the first non-volatile metadata storage device or the second non-volatile metadata storage device. In some implementations calculating comprises estimating the cache write resiliency ratio based on capacity of the first non-volatile metadata storage device relative to capacity of the second non-volatile metadata storage device. Some implementations comprise calculating the wear cost values as a function of a RD/WR (Read/Write) ratio that is indicative of likelihood of data associated with the respective pages of metadata that will possibly be changed due to a write. In some implementations calculating comprises estimating the RD/WR ratio based on an IO profile of multiple extents of the data. Some implementations comprise calculating the wear cost values as a function of a term that is indicative of age of the respective page of metadata in the cache since most recent use. Some implementations comprise calculating the wear cost values as a function of: a first term that is indicative of whether the respective page of metadata will be written to the first non-volatile metadata storage device or the second non-volatile metadata storage device; a second term that is indicative of likelihood of data associated with the respective pages of metadata that will possibly be changed due to a write; and a third term that is indicative of age of the respective page of metadata in the cache since most recent use. Some implementations comprise independently weighting the first term, the second term and the third term. Some implementations comprise, wherein the first term and the second term are estimates based on an IO profile, adjusting the weights in response to a change in the IO profile. Some implementations comprise, wherein a portion of the cache is allocated for the metadata, and adjusting the portion of cache allocated for the metadata based on a difference between calculated write count limit per unit time period for the second non-volatile metadata storage drive and actual writes per unit time period for the second non-volatile metadata storage drive.

DETAILED DESCRIPTION

Some aspects, features and implementations described herein may include machines such as computers, electronic components, optical components, and processes such as computer-implemented steps. It will be apparent to those of ordinary skill in the art that the computer-implemented steps may be stored as computer-executable instructions on a non-transitory computer-readable medium. Furthermore, it will be understood by those of ordinary skill in the art that the computer-executable instructions may be executed on a variety of tangible processor devices. For ease of exposition, not every step, device or component that may be part of a computer or data storage system is described herein. Those of ordinary skill in the art will recognize such steps, devices and components in view of the teachings of the present disclosure and the knowledge generally available to those of ordinary skill in the art. The corresponding machines and processes are therefore enabled and within the scope of the disclosure.

The terminology used in this disclosure is intended to be interpreted broadly within the limits of subject matter eligibility. The terms "logical" and "virtual" are used to refer to features that are abstractions of other features, e.g. and without limitation abstractions of tangible features. The term "physical" is used to refer to tangible features. For example, a virtual storage device could be based on multiple physical storage drives. The term "logic" is used to refer to special purpose physical circuit elements and software instructions that are stored on a non-transitory computer-readable medium and implemented by multi-purpose tangible processors.

Figure 1:
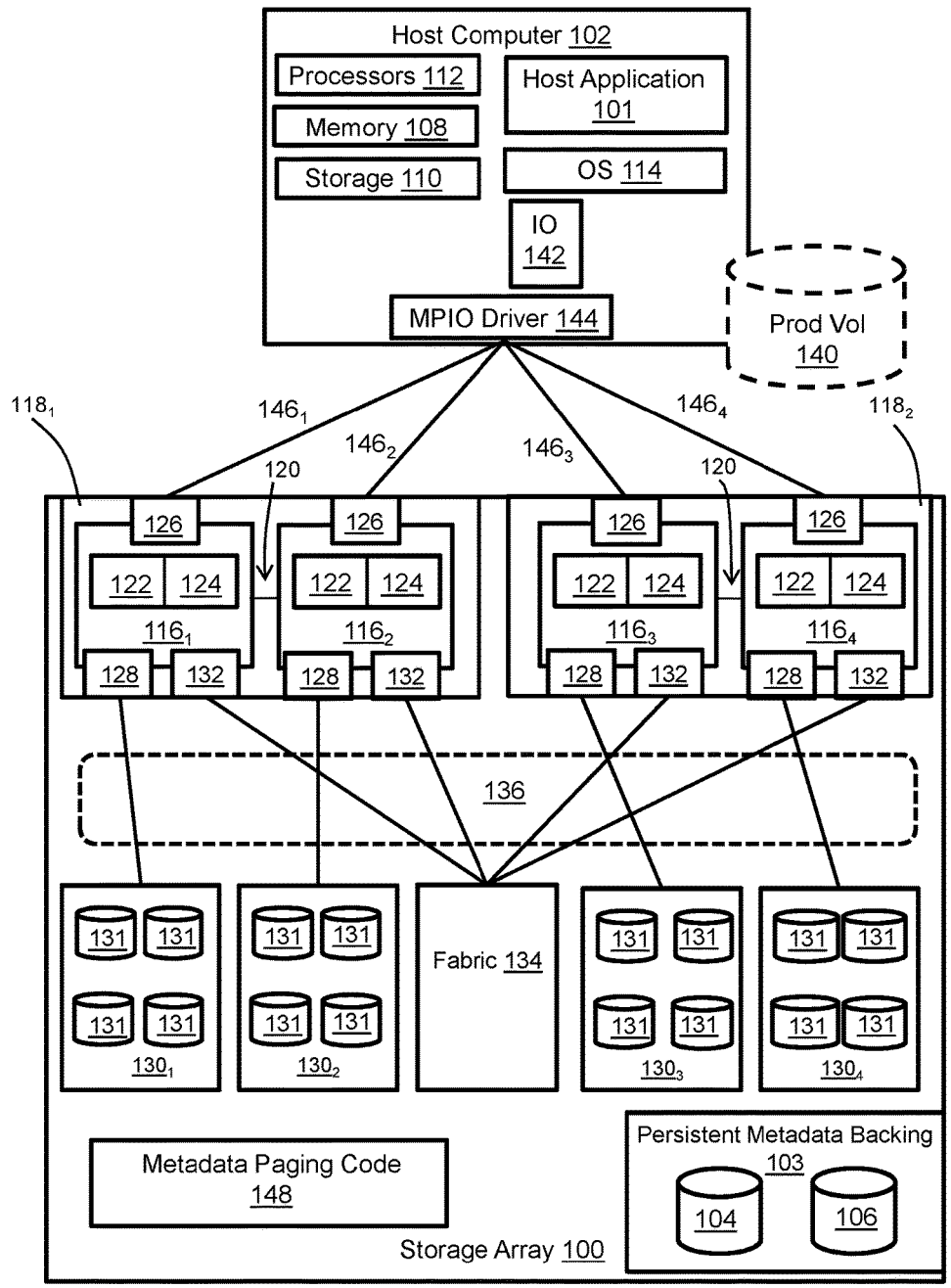
FIG. 1 illustrates a computer network in which a storage array maintains metadata on different types of storage media that are differentiated by write endurance.

FIG. 1 illustrates a computer network in which a storage array maintains metadata on different types of non-volatile storage media that are differentiated by write endurance. In the illustrated example a storage array 100 maintains data for a host application 101 running on a host computer 102. Pages of associated metadata are maintained in a persistent (non-volatile) metadata backing store 103 that includes different types of persistent storage media 104, 106 that are differentiated by write endurance. The host computer 102 may be a server with volatile memory 108, persistent storage 110, one or more tangible processors 112, and an OS (operating system) 114. The host computer might support virtual hosts running on virtual machines or containers, and although an external host computer is illustrated, internal hosts may be instantiated within the storage array. The storage array 100 includes a plurality of computing nodes $116_1$-$116_4$. Pairs of the computing nodes, e.g. ($116_1$, $116_2$) and ($116_3$, $116_4$), may be organized as storage engines $118_1$, $118_2$, respectively, for purposes of failover. The paired computing nodes of each storage engine may be directly interconnected by communication links 120. Each computing node includes at least one tangible multi-core processor 122 and a local cache 124. The local cache 124 may include, for example and without limitation, volatile memory components such as RAM (random access memory). Each computing node may include one or more FEs 126 (front-end directors, a.k.a. front end adapters) for communicating with the host computer 102. Each computing node $116_1$-$116_4$ may also include one or more BEs 128 (back end directors, a.k.a. back end adapters) for communicating with respective associated back end storage bays $130_1$-$130_4$, thereby enabling access to managed drives 131. The managed drives 131 may include tangible storage components of one or more technology types, for example and without limitation SSDs (solid state devices) such as flash, and HDDs (hard disk drives) such as SATA (Serial Advanced Technology Attachment) and FC (Fibre Channel). Each computing node may also include one or more CAs (channel directors, a.k.a. channel adapters) 132 for communicating with other computing nodes via an interconnecting fabric 134. Each computing node may allocate a portion or partition of its respective local cache 124 to a virtual shared "global" cache 136 that can be accessed by other computing nodes, e.g. via DMA (direct memory access) or RDMA (remote direct memory access). Any number of host computers could be supported by the storage array, and any number of storage arrays could be included in the computer network. The host computers may be connected to the storage array via a communication network. The communication network may include various network nodes, e.g. switches, routers, hubs, and other network devices, and may include one or more of the Internet, a WAN (wide area network), MAN (metropolitan area network) and LAN (local area network).

The host application 101 uses storage services that are provided by the storage array 100. For example, the host application may write host application data to the storage array and read host application data from the storage array in order to perform various host application functions. Examples of host applications may include but are not limited to file servers, block servers and databases. Multiple instances of a host application may run on a host computer, and multiple host computers may be simultaneously supported by the storage array. The storage array may include a wide variety of features for protecting against loss of host application data and assuring availability of host application data.

In order to provide storage services to host application 101, the computing nodes $116_1$-$116_4$ create and maintain a logical production volume 140 of storage for host application data. Without limitation, the production volume 140 may be referred to as a production device, production volume, production LUN or host LUN, where LUN (logical unit number) is a number used to identify the logical storage volume in accordance with the SCSI (small computer system interface) protocol. The production volume 140 represents an abstraction layer between the managed drives 131 and the host application 101. From the perspective of the host application 101, the production volume 140 is a single data storage device having a set of contiguous fixed-size LBAs (logical block addresses) on which data used by the host application resides. However, the data used by the host application may actually be maintained by the computing nodes 116₁-116₄ at non-contiguous addresses on various different managed drives 131.

In order to service IOs (input-output requests) from the host application 101, the storage array 100 maintains metadata that indicates, among various things, mappings between production volume 140 storage space and the locations of extents of host application data on the managed drives 131. In response to an IO 142 from the host computer 102 to the production volume 140, the metadata is used to access the managed drives. An MPIO (multi-path input-output) driver 144 in the host computer 102 selects a path on which to send the IO to the storage array. There are multiple paths 146₁-146₄ between the host computer 102 and the storage array 100, e.g. one path per FE 126. Each path may have a locally unique address that is known to the MPIO driver 144. However, the host application 101 is not aware of the paths and addresses because it views the production volume 140 as being available via a single logical path. The paths may be selected by the MPIO driver based on a wide variety of techniques and algorithms including, for context and without limitation, performance and load balancing. In the case of a read IO the storage array uses the metadata to locate the requested data, e.g. in the shared cache 136 or managed drives 131. If the requested data is not in the shared cache then it is temporarily copied into the shared cache from the managed drives and sent to the host application via one of the computing nodes. In the case of a write IO the storage array creates metadata that maps the production volume address with a location to which data is written on the managed drives. The shared cache 136 may enable the production volume 140 to be reachable via all of the computing nodes and paths, although the storage array can be configured to limit use of certain paths to certain production volumes.

Host application data sets may be large so the corresponding metadata may also be large. While it is technically feasible to implement the shared cache 136 with a capacity that is large enough to hold all of the metadata associated with the production volume, the cost may be relatively high because the cost per unit of storage of the shared cache is greater than that of persistent storage media. Further, maintaining all metadata in cache may not be necessary because only a portion of the metadata is typically in use at a given point in time. Consequently, there may be an advantage to maintaining only a portion of the metadata in the shared cache. This may be accomplished by maintaining metadata on persistent storage media and swapping pages of metadata into the shared cache as needed. If a portion of the shared cache that is allocated for metadata is full when an IO is received then a first page of metadata may be flushed from the shared cache to persistent metadata backing storage 103 in order to free space to copy a second page of metadata from the persistent metadata backing storage 103 into the shared cache 136 in order to service the IO. This technique is generally referred to herein as "metadata paging" because pages of metadata are swapped.

For performance reasons it may be desirable for the persistent metadata backing store 103 to be implemented with high performance components such as SSDs, an example of which might be NAND flash memory. A technical complication is that NAND flash SSDs have a finite service life that is a function of the number of write operations performed, i.e. P/E (program/erase) cycles. Further, wear is not limited to the addresses of the data being changed because NAND flash SSDs erase in blocks before writing to a page so the memory locations actually P/E cycled may be several times larger than the size of the data being changed. SSD endurance targets and capabilities may be described in terms of DWPD (Drive Writes Per Day) that can be sustained for a certain time period, e.g. 3 or 5 years. In general, SSDs with relatively high DWPD capability are more costly than SSDs with relatively lower DWDP capability. One aspect of the illustrated storage array is that the persistent metadata backing store 103 includes multiple types of persistent storage media that are differentiated by write endurance, e.g. in terms of DWPD. For example, the storage media may include high endurance flash SSDs 104 and low endurance flash SSDs 106. The cost of the persistent metadata backing store, and thus the storage array, may be reduced by using such a combination of SSD endurance types. As will be explained in greater detail below, metadata paging code 148 helps to avoid exceeding predetermined endurance limit targets of the SSDs 104, 106.

Figure 2:
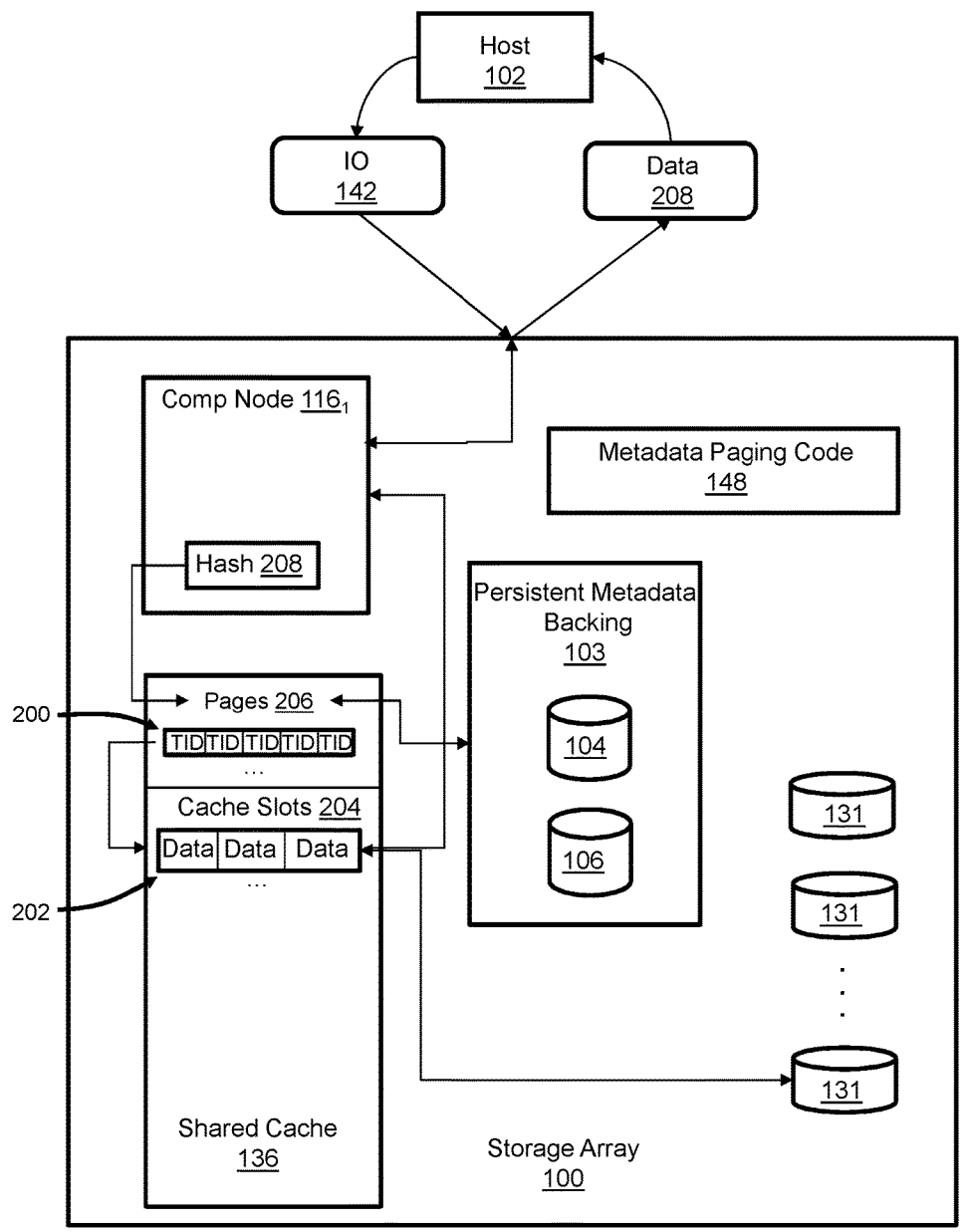
FIG. 2 illustrates metadata paging in the storage array of FIG. 1 in greater detail.
Figure 3:
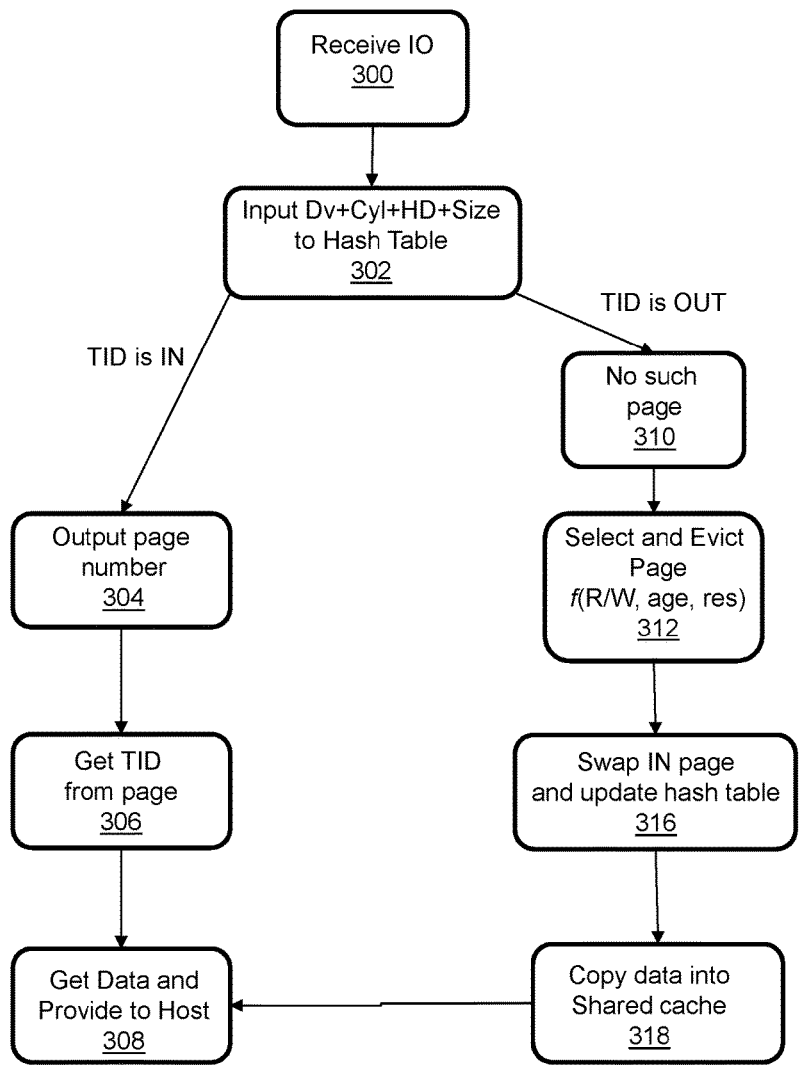
FIG. 3 is a flow diagram of aspects of metadata paging in FIG. 2.

Referring to FIGS. 2 and 3, cached metadata may be in an allocated portion of the shared cache 136 and include TIDs (track ID tables) 200 that contain pointers to host application data 202 located in cache slots 204 in another portion of the shared cache 136 that is allocated for data. The TIDs may be maintained in fixed-size pages 206, e.g. and without limitation 4 KB, where each page holds multiple TIDs. The procedure for finding and utilizing a TID to satisfy an IO received from the host computer as shown in block 300 varies depending on whether the TID is present in the shared cache 136. The computing node, e.g. computing node 116₁, may identify corresponding TIDs by inputting the device number, cylinder number, head (track) and size obtained from the IO 142 into a hash table 208 as indicated in block 302. A wide variety of descriptive data structures could be used, of which hash table 208 is simply one example. The hash table 208 indicates the locations of TIDs in pages 206 in the shared cache 136. If there is an entry in the hash table corresponding to the inputted information then the TIDs are present in the shared cache 136. In other words, the TID is "IN," which is also known as a "cache hit." In the case of a cache hit the hash table outputs a corresponding page number as indicated in block 304. The page number is used to locate the page that holds the TIDs in the shared cache. The TIDs are obtained from the shared cache as indicated in block 306 and used to find and retrieve the corresponding data from the cache slots 204 as indicated in block 308. In the case of a Read IO the data 208 may then be returned to the host computer 102. In the absence of a corresponding entry in the hash table 208, i.e., when the TID is "OUT," which is also known as a "cache miss," the hash table 208 outputs an indicator that there is no such page frame referenced in the hash table as indicated in block 310. Assuming that the portion of the shared cache that is allocated for metadata pages is full, the computing node uses the metadata paging code 148 to select and evict a page of metadata from the shared cache as indicated in block 312. A page for the required TIDs is then created in the shared cache or copied into the shared cache from the persistent metadata backing storage 103 as indicated in block 316. The TIDs in the page that is being swapped into the shared cache may then be used to obtain the host application data from the managed drives 131 if that is what is required to service the IO. In particular, the data may be copied from the managed drives into the cache slots as indicated in block 318 and returned to the host computer as indicated in block 308 and described above.

As indicated in block 312, the metadata paging code 148 selects the page to evict from the shared cache based on per page wear cost values for each one of the pages of metadata in the cache. The values are calculated as a function of the RD/WR (Read/Write) ratio of the associated host application data, the age of the page in the shared cache since most recent use, and a cache write resiliency ratio. The individual terms of the function may be weighted, for example such that the wear cost value V for a page is:

$$V=\text{RD/WR\_ratio}*X+\text{page\_LRU\_age}*Y+\text{cache\_write\_resiliency\_ratio}*Z,$$

where X, Y and Z are independently adjustable weights. The RD/WR ratio term may represent the relative difference in wear cost for data associated with reads versus writes. If the page was used only for data reads then it is not necessary to P/E cycle the SSDs 104, 106 in order to swap the page out because the metadata has not changed. However, if the page was used for a write operation then it is necessary to P/E cycle one of the SSDs 104, 106 in order to swap the page out because the metadata has changed. P/E cycling implies greater wear cost. If the actual RD/WR ratio of the data is known then that value may be used. However, it may be possible to statistically estimate a RD/WR_ratio on an extent, block, track, device or other level because certain host application processes have different IO profiles that may be predictable. The page_LRU_age term may represent the age since the page was last used, e.g. an indicator of when last recently used. In other words, the term is a temporal indicator of how long the page has been in shared cache without being used to locate data. Pages that have not been recently used may be more suitable for being swapped out than pages that have been recently used, e.g. and without limitation due to different likelihoods of being required again in the near future. The cache_write_resiliency_ratio may be an indicator of the likelihood of the page being swapped out to high endurance SSDs 104 versus low endurance SSDs 106. The wear cost of swapping out to low endurance SSDs may be viewed as greater than the wear cost of swapping out to high endurance SSDs based on DWPD differences. The cache_write_resiliency_ratio may be estimated in different ways including but not limited to dividing the high endurance SSD capacity by the low endurance SSD capacity, where the capacity may be free space or all space. The page with the lowest wear cost, which may correspond to the greatest value V, is selected to be swapped out of the shared cache.

Figure 4:
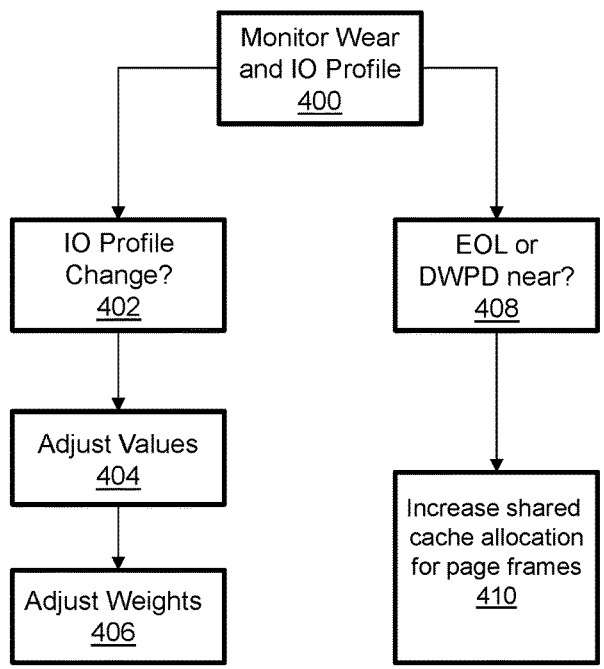
FIG. 4 illustrates further aspects of metadata paging, including adjustments based on monitored wear and IO profile changes.

FIG. 4 illustrates further aspects of metadata paging with different write endurance SSDs. P/E wear on the SSDs of the persistent metadata backing store and the characteristic profile of IOs is monitored as indicated in block 400. If the IO profile changes, as determined in block 402, then estimated values for terms of the wear cost function may be adjusted as indicated in block 404. For example, if the estimated RD/WR_ratio or one or more other estimated terms is determined to have become inaccurate then the estimate may be adjusted. A more write heavy I/O profile might favor greater use of high-endurance flash, and thus selection of metadata pages that reside on the high endurance flash. The weights X, Y, Z may also or alternatively be adjusted as indicated in block 406. For example and without limitation, if the IO profile change includes an indication that there are many more writes per read than previously estimated then the value of weight X may be adjusted to increase the relative influence of the RD/WR_ratio on the wear cost value calculation. If the number of writes actually implemented approaches the target limit set for one or more of the SSDs of the persistent metadata backing store as determined in block 408 then the amount of shared cache allocated for pages may be temporarily increased as indicated in block 410. For example and without limitation, if the number of writes per cell approaches the endurance limits of the flash, e.g. the flash is approaching EOL (End Of Life), or if the writes in a 24 hour period approaches the DWPD target limit, then the cache allocation for pages may be increased for the remainder of the 24 hour period. The feature may be implemented for any time period or number of different time periods.

A number of features, aspects, embodiments and implementations have been described. Nevertheless, it will be understood that a wide variety of modifications and combinations may be made without departing from the scope of the inventive concepts described herein. Accordingly, those modifications and combinations are within the scope of the following claims.

What is claimed is:

1. An apparatus comprising:
a plurality of computing nodes, each computing node comprising a processor and a cache, at least a portion of each cache being organized as a shared cache that is accessible to each of the computing nodes;
a plurality of non-volatile data storage drives on which data is stored, the data being accessed by the computing nodes to service IOs (input-output requests);
persistent metadata storage comprising:
a first non-volatile metadata storage device on which metadata is stored, the metadata indicating locations of extents of the data on the data storage drives, the first metadata storage device having a first write endurance; and
a second non-volatile metadata storage device on which metadata is stored, the second metadata storage device having a second write endurance, wherein the first write endurance is greater than the second write endurance; and
a program, stored on non-transitory computer-readable memory, that selects, based on wear cost values of each of multiple pages of metadata in the shared cache, a first page of metadata to evict from the shared cache to the persistent metadata storage in order to free space for a second page of metadata, wherein the wear cost values are calculated as a function of a cache write resiliency ratio that is indicative of whether the respective page of metadata will be written to the first non-volatile metadata storage device or the second non-volatile metadata storage device.

2. The apparatus of claim 1 wherein the cache write resiliency ratio is an estimate based on capacity of the first non-volatile metadata storage device relative to capacity of the second non-volatile metadata storage device.

3. The apparatus of claim 1 wherein the wear cost values are calculated as a function of a RD/WR (Read/Write) ratio that is indicative of likelihood of data associated with the respective pages of metadata that will possibly be changed due to a write.

4. The apparatus of claim 3 wherein the RD/WR ratio is an estimate based on an IO profile of multiple extents of the data.

5. The apparatus of claim 1 wherein the wear cost values are calculated as a function of a term that is indicative of age of the respective page of metadata in the cache since most recent use.

6. The apparatus of claim 1 wherein the wear cost values are calculated as a function of:
   a first term that is indicative of whether the respective page of metadata will be written to the first non-volatile metadata storage device or the second non-volatile metadata storage device;
   a second term that is indicative of likelihood of data associated with the respective pages of metadata that will possibly be changed due to a write; and
   a third term that is indicative of age of the respective page of metadata in the cache since most recent use.

7. The apparatus of claim 6 wherein the first term, the second term and the third term are each independently weighted.

8. The apparatus of claim 6 wherein the first term and the second term are estimates based on an IO profile, and wherein the weights are adjusted in response to a change in the IO profile.

9. The apparatus of claim 1 wherein a portion of the cache is allocated for the metadata, and wherein the portion of cache allocated for the metadata is adjusted in size based on a difference between calculated write count limit per unit time period for the second non-volatile metadata storage drive and actual writes per unit time period for the second non-volatile metadata storage drive.

10. The method of claim 1 comprising calculating the wear cost values as a function of:
    a first term that is indicative of whether the respective page of metadata will be written to the first non-volatile metadata storage device or the second non-volatile metadata storage device;
    a second term that is indicative of likelihood of data associated with the respective pages of metadata that will possibly be changed due to a write; and
    a third term that is indicative of age of the respective page of metadata in the cache since most recent use.

11. The method of claim 10 comprising independently weighting the first term, the second term and the third term.

12. The method of claim 10 wherein the first term and the second term are estimates based on an IO profile, and comprising adjusting the weights in response to a change in the IO profile.

13. A method comprising:
    in a storage array comprising a plurality of computing nodes, each computing node comprising a processor and a cache, at least a portion of each cache being organized as a shared cache that is accessible to each of the computing nodes, and a plurality of non-volatile data storage drives on which data is stored, the data being accessed by the computing nodes to service IOs (input-output requests):
    maintaining metadata on persistent metadata storage comprising:
       a first non-volatile metadata storage device on which metadata is stored, the metadata indicating locations of extents of the data on the data storage drives, the first metadata storage device having a first write endurance; and
       a second non-volatile metadata storage device on which metadata is stored, the second metadata storage device having a second write endurance, wherein the first write endurance is greater than the second write endurance;
    calculating wear cost values as a function of a cache write resiliency ratio that is indicative of whether a respective page of metadata will be written to the first non-volatile metadata storage device or the second non-volatile metadata storage device when evicted from the shared cache;
    selecting, based on the wear cost values of each of multiple pages of metadata in the shared cache, a first page of metadata to evict from the shared cache to the persistent metadata storage in order to free space for a second page of metadata; and
    evicting the first page of metadata from the shared cache.

14. The method of claim 13 wherein calculating comprises estimating the cache write resiliency ratio based on capacity of the first non-volatile metadata storage device relative to capacity of the second non-volatile metadata storage device.

15. The method of claim 13 comprising calculating the wear cost values as a function of a RD/WR (Read/Write) ratio that is indicative of likelihood of data associated with the respective pages of metadata that will possibly be changed due to a write.

16. The method of claim 15 wherein calculating comprises estimating the RD/WR ratio based on an TO profile of multiple extents of the data.

17. The method of claim 13 comprising calculating the wear cost values as a function of a term that is indicative of age of the respective page of metadata in the cache since most recent use.

18. The method of claim 13 wherein a portion of the cache is allocated for the metadata, and comprising adjusting the portion of cache allocated for the metadata based on a difference between calculated write count limit per unit time period for the second non-volatile metadata storage drive and actual writes per unit time period for the second non-volatile metadata storage drive.

* * * * *